Oct. 19, 1965    R. C. BUELER    3,212,825
EMERGENCY RELAY VALVE
Filed Oct. 31, 1961    2 Sheets-Sheet 1

INVENTOR
RICHARD C. BUELER
BY Gravely, Lieder
 & Woodruff
ATTORNEYS

INVENTOR
RICHARD C. BUELER
BY Gravely, Lieder & Woodruff
ATTORNEYS

United States Patent Office 3,212,825
Patented Oct. 19, 1965

3,212,825
EMERGENCY RELAY VALVE
Richard C. Bueler, Glendale, Mo., assignor to Wagner Electric Corporation, St. Louis, Mo., a corporation of Delaware
Filed Oct. 31, 1961, Ser. No. 149,057
5 Claims. (Cl. 303—29)

This invention relates generally to relay type pressure fluid control valves, and more specifically to an emergency relay valve for governing the application of the trailer brakes of a tractor-trailer combination in the event of failure of the conduits between the two units or the reduction of the pressure fluid supply on the tractor below a predetermined value or total failure thereof.

The principal object of the present invention is to provide an improved emergency relay valve for a trailer braking system in a tractor-trailer combination, the valve being responsive to pressure fluid reductions below preset reserve values or complete failure in the tractor unit.

Another object is to provide a relay valve that is efficient in controlling the application of auxiliary or reserve pressure fluid to the trailer brakes, and which establishes full reserve pressures in the trailer brakes in the event of a failure of the main or primary pressure fluid source.

Another object is to provide improvements in valve construction for increased efficiency of valve operation and reduced manufacturing costs.

Still other objects and advantages of the invention will become more apparent hereinafter.

The invention is embodied in a novel relay valve of the type described and claimed hereinafter, and in the combinations and arrangements of parts thereof.

Figures 1, 3:
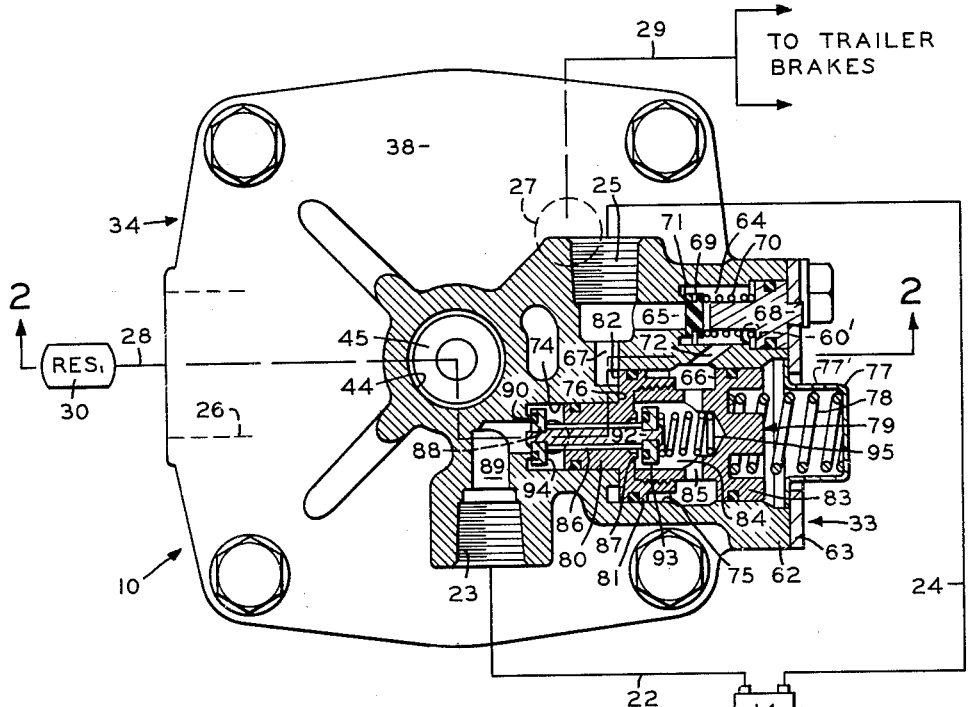
Figure 2:
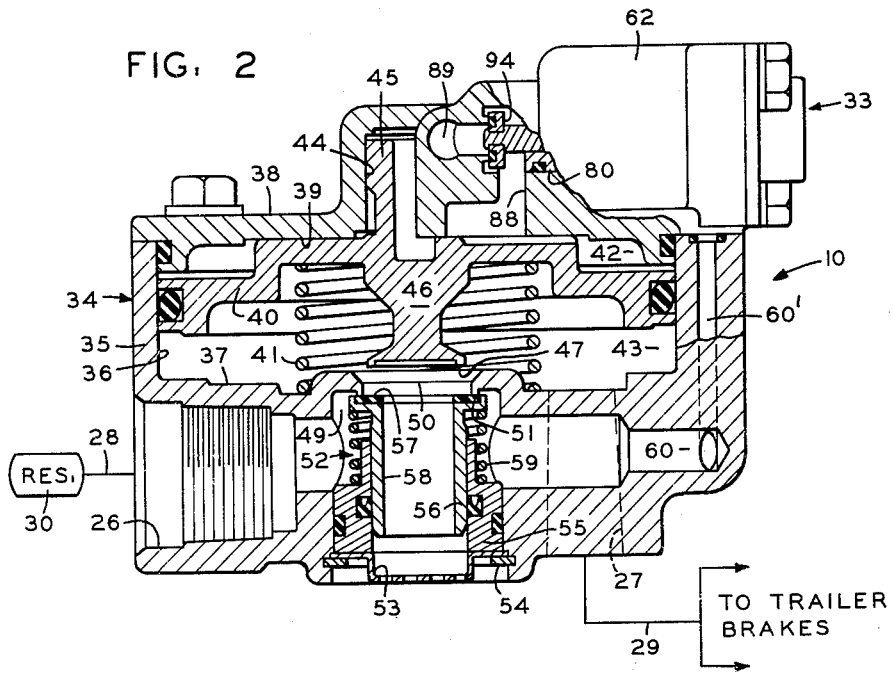
Figure 4:
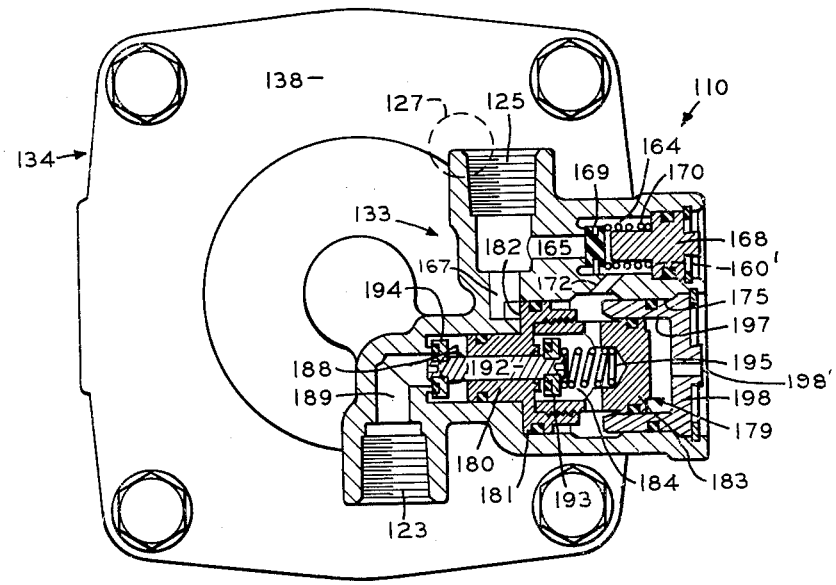

In the accompanying drawings which form a part of this specification and wherein like numerals refer to like parts wherever they occur:

FIG. 1 is a horizontal cross-sectional view taken through a control portion of a relay valve embodying the invention, and further showing a tractor-trailer braking system by simplified diagrammatic illustration, FIG. 2 is a vertical cross-sectional view of the relay valve taken substantially along line 2—2 of FIG. 1, FIG. 3 is a fragmentary view of the valve similar to FIG. 1, but showing the parts of the control portion in another condition of operation, and FIG. 4 is a fragmentary view similar to FIG. 1, but showing a modified control portion of the valve.

Referring now to FIG. 1, it will be seen that an emergency relay valve 10 embodying the invention is shown connected in an air braking system 11, diagrammatically illustrated, of a typical tractor-trailer combination (not shown). Briefly, the braking system 11 is provided with an air compressor 12 connected to a main air tank or reservoir 13, which in turn is connected to the emergency line inlet of a tractor protector valve 14 by an emergency line or conduit 15. The control inlet to the tractor protector valve 14 is also connected to the line 15 or main reservoir 13 by a control line or conduit 16 having a manual valve 17 interposed therein. A conduit 18 connects the main reservoir 13 with the inlet of an application valve 19, and the application valve has an outlet port connected by a service line 20 to the tractor brakes (not shown). Another service line 21 connects an outlet port of the application valve to the service line inlet of the tractor protector valve 14.

A trailer service line or conduit 22 is connected between the service outlet port of the tractor protector valve 14 and the service inlet port 23 of the emergency relay valve 10, and a trailer emergency line or conduit 24 interconnects the emergency outlet port of the tractor protector valve 14 with the emergency inlet port 25 of the emergency relay valve 10. The relay valve 10 also has ports 26 and 27 connected by conduits 28 and 29 to an auxiliary tank or reservoir 30 and the trailer brakes (not shown), respectively.

The tractor protector valve 14 may be of conventional construction to maintain the inlet and outlet service and emergency line connections thereto in fluid communication during nomral operation, and to close off communication due to breakage or other failure in the lines in order to maintain the integrity of the tractor portion of the system 11. For a more complete understanding of the tractor protector valve 14, reference may be had to Fites Patent No. 2,859,763 issued November 11, 1958.

Referring now to FIGS. 1 and 2, the relay valve 10 according to the present invention comprises a first housing 33 forming an inlet control portion of the valve and a second housing 34 forming an outlet portion of the valve 10. The first and second housings 33 and 34 may be integrally formed, as shown, and are interconnected and interdependent for operation as will be described. The second housing 34 comprises a main casing 35 having a large piston chamber defined by a side wall 36 and bottom wall 37, and a cover plate 38 is sealably secured to main casing 35 and defines the upper wall 39 of the piston chamber. A relay piston 40 is slidably positioned in the piston chamber and is normally biased by a return spring 41 against the upper wall 39, the piston 40 dividing the chamber into an expansible upper actuation or relay chamber portion 42 and a lower reaction or outlet chamber portion 43.

The cover plate 38 has a central boss with a bore 44 into which a central guide 45 of the piston 40 extends upwardly. The piston 40 also has a downwardly projecting central stem 46 with an annular valve seat 47 formed on its free end.

It will be noted that the port 27 to the trailer brake lines 29 is formed in the lower wall or base 37 of the main casing 35 in open fluid communiaction with the reaction chamber 43. The lower wall or base 37 of the main casing 35 is also provided with a central relay valve chamber 49 connected to the reaction chamber 43 through a central opening 50 in the wall 37. The opening 50 is adapted to receive the stem 46 of the piston 40, and an annular valve seat 51 is formed in the relay valve chamber 49 on the periphery of the opening 50. The relay valve chamber 49 is formed as a bore from the outside of the casing, and a relay valve assembly 52 is mounted in the chamber 49 by a perforated retainer plate 53 and snap ring 54 or the like. The relay valve assembly 52 includes a bushing 55 and a sleeve type valve member 56 having an enlarged head portion with an annular valve element 57 and a central bore 58. The valve member 56 is biased toward the reaction chamber 43 by a spring 59 to normally seal the valve element 57 against the valve seat 51 and prevent fluid flow from the relay valve chamber 49 to the reaction chamber 43 while exhausting the reaction chamber 43 and trailer brake lines to atmosphere through the valve member bore 58 and the perforated plate 53.

The port 26, to which the auxiliary reservoir 30 is connected by line 28, is formed in the lower wall section 37 of the main casing 35 in open fluid communication with the relay valve chamber 49. The main casing is also provided with passages 60 and 60' extending from the relay valve chamber 49 to the inlet control housing 33.

The inlet control housing 33 is preferably cast integral with the cover plate 38 of the outlet housing 34, and includes a valve casing portion 62 and closure plate 63. The emergency line port 25 is formed in the inlet control housing 33 and connects with an inlet chamber 64 through passage 65 and a control chamber, shown generally at 66, through passage 67. The inlet chamber 64 is sealed by an insert plug 68 and a check valve 69 is biased by a spring 70 to a normally closed position against a valve seat 71 formed at the inlet passage 65. The passage 60' to the relay valve chamber 49 and auxiliary reservoir 30 is in open fluid communication with the inlet chamber 64. The inlet chamber 64 is also connected to the control chamber 66 intermediate its ends by a passage 72.

The control chamber 66 includes a bore 74 and counterbore 75 having a shoulder 76 therebtween connected by the passage 67 with the emergency inlet port 25. The counterbore 75 is closed at its outer end by a flanged cup 77 having an atmospheric passage 77, the cup seating one end of a spring 78. A stepped emergency control piston 79 includes a small end 80 slidable in the bore 74 and a large end 81 slidable in the counterbore 75, the piston having a fluid responsive shoulder area 82 normally biased against the chamber shoulder 76 by the spring 78. It will be observed that the large end 81 of the piston 79 also includes a piston extension member 83 threaded thereto and forming an internal chamber 84, the extension member 83 or large piston portion having radial ports 85 to provide fluid communication between the internal chamber 84 and passage 72 to the inlet chamber at all times. An axial passage 86 is also formed in the piston 79 from the small end 80 to the internal chamber 84 and a valve seat 87 is formed on the piston 79 around the passage 86 projecting into the chamber 84.

The bore 74 at the small end 80 of the control piston 79 is connected by a passage 88 with the relay chamber 42 above the relay piston 40, and the service line port 23 is also connected to the bore 74 through passage 89. A valve seat 90 is formed at the end of the bore 74 around the passage 89.

Fluid communication between the internal chamber 84 or the passage 89 to the bore 74 and passage 88 is controlled by a dumbbell type valve assembly having a shank 92 slidable in the axial passage 86, but permitting fluid flow therethrough. An emergency inlet control valve 93 is positioned on the end of the shank in the internal chamber 84, and a service inlet control valve 94 is formed on the other end of the shank 92 in the bore 74. A spring 95 in the internal chamber 84 biases the emergency and service inlet control valves 93 and 94 toward the respective valve seats 87 and 90 therefor.

In the charging operation of the valve 10, assuming that the reservoirs 13 and 30 are empty, FIGS. 1 and 2 show the parts of the relay valve in the normally inoperative condition thereof. When the air compressor 12 is placed in operation, pressure fluid will be discharged to the main reservoir 13 and will flow therefrom through the conduits 15 and 16 to the control port of the tractor protector valve 14. When a predetermined air pressure is developed in the reservoir 13 and active in the control port of the tractor protector valve 14, this valve will operate in a well known manner to open connections between its emergency inlet and outlet ports and between its service inlet and outlet ports.

The pressure fluid will now pass from the tractor reservoir 13 through the emergency line 15, tractor protector valve 14 and emergency line 24 to the emergency inlet port 25 of the emergency relay valve 10 and will act on the effective area of the control piston shoulder 82. The pressure fluid will also open the check valve 69 and flow simultaneously from the inlet chamber 64 into the passages 60, 60' and 72. From the passages 60, 60' the pressure fluid will pass through the relay valve chamber 49 and port 26 through the conduit 28 to the trailer or auxiliary reservoir 30. From the passage 72, the pressure fluids flows into the internal chamber 84 of the control piston 79 and acts on the equal and opposite areas of the large end 81 of the piston 79, and from the internal chamber 84 the pressure fluid flows past the open emergency inlet control valve 93 through the axial passage 86 and passage 88 into the expansible relay chamber 42 and acts upon the effective area of the relay piston 40.

The air pressure built up in the relay piston chamber 42 will move the piston 40 downwardly causing the valve seat 47 of the stem to seal on the valve 57 of the valve assembly 52 to close off the exhaust passage 58. The valve member 56 is then moved downwardly by the relay piston 40 to unseat the valve 57 from the seat 51 and provide communication from the reservoir 30 and the relay chamber 49 through opening 50 to the reaction chamber 43. Accordingly, pressure fluid passes through the port 27 and lines 29 to apply the trailer brakes in a conventional relay manner.

It will be apparent that the air compressor 12 will continue to operate until a predetermined fluid pressure is provided in the main reservoir 13, and a substantially equal fluid pressure will also be developed in the auxiliary reservoir 30 due to the fact that the check valve 69 is loaded by a spring 70 of negligible force. When the pressure in the port 25 and passage 67 reaches a preselected value, the force of the pressure acting on the area 82 of the control piston 79 moves the piston against the compressive force of the spring 78 whereby the emergency inlet control valve 93 is seated on the valve seat 87 to seal off the axial passage 86. It will be noted that the pressure fluid in the relay chamber 42 is also acting on the effective area of the small end 80 of the control piston 79, which force is additive to the force of the pressure acting on the area 82. However, the control piston 79 is moved further against the compressive force of the spring 78, the service inlet control valve 94 is moved from its seat 90 to meter pressure fluid from the relay chamber 42 and small end 80 of the piston. The continued pressure built up on the area 82 of the piston is greater than the loss of pressure fluid from the small end 80 whereby the control piston 79 is moved to and maintained in a rightward position overcoming the spring 78 and, in its fully charged or cocked position, the control valve 79 carries the service inlet valve 94 to an unrestricted position relative to its valve seat 90.

When the service inlet valve 94 is opened, the pressure fluid in the relay chamber 42 is exhausted through the service port 23 and service lines 22 and 21 and through an exhaust port of the application valve 19 in the braking system 11. Therefore, the force created by the fluid pressure in the reaction chamber 43 acting on the effective area of the relay piston 40, together with the compressive force of the return spring 41, moves the relay piston 40 upwardly to seat the valve element 57 on the valve seat 51 to close off communication between the reaction chamber 43 and the trailer reservoir 30. The valve seat 47 on the stem 46 is then moved from the valve element 57 to open the exhaust passage 58 and exhaust the fluid pressure from the trailer brakes through the reaction chamber 43. The emergency relay valve 10 is in charged or cocked position with the relay piston 40 and relay valve assembly 52 in the FIG. 2 position thereof and with the check valve 69, control piston 79, emergency inlet control valve 93 and service inlet control valve 94 in the FIG. 3 position thereof.

During a normal service application, pressure fluid from the main or tractor reservoir 13 flows through the application valve 19 due to actuation thereof, and enters the service port 23 and flows past the open service inlet control valve 94 into the relay chamber 42. The compressive force of the spring 95 together with the force of pressure fluid in the internal chamber 84 acting on the valve 93 of course prevents the opening of this valve. The fluid pressure in the relay chamber 42 acts on the relay piston 40 to move the piston downwardly to close off the exhaust passage 58 and move the valve element 57 from the seat 51 whereby pressure fluid is metered from the trailer reservoir 30 past the relay valve into the reaction chamber and therefrom through the port 27 to the trailer brakes. A service application is terminated by releasing the application valve 19 so that pressure fluid in the relay chamber 42 is exhausted through the application valve, as described, and the fluid pressure in the reaction chamber 43 returns the relay piston 40 to its inoperative position allowing the relay valve assembly 52 to return to its normal position and open the exhaust passage 58 for pressure fluid in the trailer brakes. Due to reductions of fluid pressure in the reservoirs 13 and 30 by service applications, the compressor 12 will be cyclically operative to recharge the reservoirs to the preselected maximum pressure. However, the valves 79, 93 and 94 will remain in cocked position, FIG. 3, and the check valve 69 will only be open during the charging operation or when a pressure drop from the inlet 25 to the inlet chamber 64 occurs.

The emergency relay valve 10 is operative to automatically set the trailer brakes under emergency conditions, which generally occur in the system externally of the valve 10 and effect a reduction of pressure below a predetermined amount in the emergency line 24 and port 25. For instance, this reduction of pressure can occur due to a break in the emergency line thereby exhausting pressure fluid from the emergency port 25 as well as from the control port of the tractor protector valve 14 and from the tractor reservoir 13. It can also occur due to failure of the service lines, compressor or other means whereby the fluid pressure in the tractor reservoir 13 drops to a value causing the tractor protector valve 14 to close in a conventional manner and exhaust to atmosphere the service and emergency outlet lines to the emergency relay valve 10.

When the fluid pressure in the emergency port 25 of the emergency relay valve 10 falls below a predetermined value, the compressive force of the spring 78 overcomes the force of the pressure acting on the area 82 of the control piston 79 thereby moving the piston leftwardly to close the service inlet control valve 94 and opening the emergency inlet control valve 93. This action allows air flow from trailer reservoir 30 through the passages 60, 60' and the inlet control housing chambers 64 and 84 and the passages 86 and 88 to the relay chamber 42 to actuate the relay piston 40, as previously described, whereby the reservoir 30 is placed in communication with the reaction chamber 43 and the trailer brakes are applied. In order to de-activate the emergency relay valve 10 from its emergency condition, the fluid pressure must be re-established in the inlet 25 and the valve parts again moved to the charged or cocked positions by another charging operation.

Referring now to FIG. 4 wherein a modified embodiment of the emergency relay valve 110 is shown, the parts are identified by reference numerals similar to those of the principal embodiment raised to the 100 series. The extension portion 183 of the emergency control piston 179 has a reduced diameter relative to the diameter of the large end portion 181 of the piston, and the extension portion 183 is slidably mounted in the bore 197 of a plug insert 198 closing the end of the counterbore 175, the plug insert 198 having a port 198' venting the bore 197 to atmosphere. Accordingly, fluid pressure in the internal chamber 184 will act on the opposed effective areas of the large end 181 and extension 183 creating a leftward force on the control piston 179 due to the differential in area, and permitting the elimination of the control piston spring 78 shown in FIGS. 1 and 3.

The shoulder area 182 of the control piston 179 is larger than the difference in opposed areas of the large end 181 and the extension 183 in the internal chamber 184, and pressure fluid of the reservoir 130 is effective on the differential areas to create an opposing force to the force developed on the area 182. Therefore, the control piston 179 is moved to a charged position in response to a differential in forces acting in opposed directions on the effective areas of the control piston 179.

The operation of the emergency relay valve 110 is similar to the operation above set out, except under emergency conditions. A predetermined reduction in fluid pressure acting on the area 182 of the control piston 179 allows the trailer reservoir pressure acting in the internal chamber 184 on the effective differential areas of the piston 179 to move the piston leftwardly to close the service inlet control valve 194 and open the emergency inlet control valve 193 for the emergency action, as previously described.

It is now apparent that the present emergency relay valve 10, 110 provides a positive acting means for assuring the integrity of the trailer braking system and for initiating an emergency braking application due to failures in the tractor braking system or conduits or loss of tractor reservoir pressure for any reason.

The invention is intended to cover obvious changes and modifications of the emergency relay valve herein disclosed, and the invention is to be limited only by the claims which follow.

What I claim is:

1. An emergency relay valve comprising a housing having inlet, outlet and exhaust ports therein, first valve means controlling pressure fluid communication between said ports, an expansible control chamber in said housing, valve operating means for said first valve means and normally opposing expansion of said control chamber, emergency piston means slidable in said housing and defining therewith separate connection and emergency chambers, said connection chamber being in open pressure fluid communication with said control chamber, an emergency port in said housing, a pair of opposed fluid pressure responsive areas on said emergency piston means respectively subjected to the fluid pressure at said emergency port and that in said emergency chamber, passage means in said housing connecting said emergency port with said emergency chamber and inlet port, unidirectional valve means in said passage means providing pressure fluid passage only from said emergency port to said inlet port and emergency chamber, other passage means in said emergency piston between said connection and emergency chambers, a service port in said housing connected with said connection chamber, second valve means in said emergency piston means controlling pressure fluid communication between said connection chamber, emergency chamber and service port, said emergency piston means being movable to an emergency position in said housing in response to a predetermined differential between the fluid pressure at said emergency port and that in said emergency chamber acting on said pressure responsive areas to move said second valve means to a position interrupting pressure fluid communication between said service port and connection chamber and establishing pressure fluid communication between said emergency and connection chambers, and said valve operating means being movable in response to established fluid pressure in said connection and control chambers to move said first valve means to a position interrupting pressure fluid communication between said outlet and exhaust ports and establishing pressure fluid communication between said inlet and outlet ports.

2. The emergency relay valve according to claim 1 wherein said second valve means normally interrupts pressure fluid communication between said connection and emergency chambers and establishes pressure fluid communication between said connection chamber and service port.

3. An emergency relay valve comprising a housing having inlet, outlet and exhaust ports therein, first valve means controlling pressure fluid communication between said ports, an expansible control chamber in said housing, valve operating means for said first valve means and normally opposing expansion of said control chamber, emergency piston means including smaller and larger piston portions slidable in said housing, said smaller piston portion defining with said housing a connection chamber in open pressure fluid communication with said control chamber, an emergency port in said housing, a first fluid pressure responsive area on said emergency piston means between said smaller and larger piston portions subjected to the fluid pressure at said emergency port, said larger piston portion defining with said housing an emergency chamber, passage means in said housing connecting said emergency port with said emergency chamber and inlet port, unidirectional valve means in said passage means providing pressure fluid passage only from said emergency port to said inlet port and emergency chamber, a second fluid pressure responsive area on said emergency piston means in opposition to said first fluid pressure responsive area and subjected to the fluid pressure in said emergency chamber, other passage means in said emergency piston means connecting said emergency chamber with said connection chamber, a service port in said housing and connected with said connection chamber, second valve means in said emergency piston means controlling pressure fluid communication between said connection chamber, emergency chamber and service port, said emergency piston means being movable to an emergency position in said housing in response to a predetermined differential between the fluid pressure at said emergency port and that in said emergency chamber to move said second valve means to a position interrupting pressure fluid communication between said service port and connection chamber and establishing pressure fluid communication between said emergency and connection chambers, and said valve operating means being movable in response to established fluid pressure in said connection and control chambers to move said first valve means to a position interrupting pressure fluid communication between said outlet and exhaust ports and establishing pressure fluid communication between said inlet and outlet ports.

4. An emergency relay valve comprising a housing having inlet, outlet and exhaust ports therein, first valve means controlling pressure fluid communication between said ports, an expansible control chamber in said housing, valve operating means for said first valve means and normally opposing expansion of said control chamber, emergency piston means including smaller and larger piston portions slidable in said housing, a free end on said smaller piston portion defining with said housing a connection chamber in open pressure fluid communication with said control chamber, a free end on said larger piston portion subjected to the atmosphere, an emergency port in said housing, a shoulder on said emergency piston means between said smaller and larger piston portions defining a first pressure fluid responsive area subjected at all times to the fluid pressure at said emergency port, said larger piston portion defining with said housing an emergency chamber between said shoulder and the free end of said larger piston portion, passage means in said housing connecting said emergency port with said emergency chamber and inlet port, unidirectional valve means in said passage means providing pressure fluid passage only from said emergency port to said emergency chamber and inlet port, other passage means in said emergency piston means intersecting with the free end of said smaller piston portion and connecting with said emergency chamber, a second shoulder on said emergency piston means defining a second pressure fluid responsive area subjected at all times to the fluid pressure in said emergency chamber, a service port in said housing and connected with said connection chamber, second valve means in said emergency piston means normally interrupting pressure fluid communication between said emergency and connection chambers and establishing pressure fluid communication between said service port and connection chambers, said emergency piston means being movable to an emergency position in said housing when the force of the fluid pressure in said emergency chamber acting on said second area exceeds that of the force of the fluid pressure at said emergency port acting on said first area to move said second valve means to a position interrupting pressure fluid communication between said service port and connection chamber and establishing pressure fluid communication between said connection and emergency chambers, and said valve control means being movable in response to established fluid pressure in said control chamber to move said first valve means to a position interrupting pressure fluid communication between said outlet and exhaust ports and establishing pressure fluid communication between said inlet and outlet ports.

5. An emergency relay valve comprising a housing having inlet and outlet ports therein, first valve means normally urged to a closed position interrupting pressure fluid communication between said ports, an exhaust opening in said first valve means normally communicating said outlet port with the atmosphere, an expansible control chamber in said housing, valve operating means slidable in said housing and normally opposing expansion of said control chamber, a first valve seat on said valve operating means for operative engagement with said first valve means, an emergency port in said housing, emergency piston means including smaller and larger piston portions slidable in said housing, a first shoulder between said smaller and larger piston portions defining a first pressure fluid responsive area subjected at all times to the prevailing fluid pressure at said emergency port, a free end on said smaller piston portion defining with said housing a connection chamber in open pressure fluid communication with said control chamber at all times, a free end on said larger piston portion in opposed relation to the free end on said smaller piston portion and subjected at all times to the atmosphere, said larger piston portion defining with said housing an emergency chamber between said first shoulder and the free end of said larger piston portion, a second shoulder on said larger piston portion defining a second pressure fluid responsive area subjected at all times to the fluid pressure in said emergency chamber, said emergency piston means being movable to an inoperative position in said housing when the force of the fluid pressure at said emergency port acting on said first area exceeds that of the force of the fluid pressure in said emergency chamber acting on said second area, passage means in said smaller and larger piston portions having one end intersecting with the free end of said smaller piston portion, cross-passage means in said larger piston portion interconnecting the other end of said passage means with said emergency chamber, a second valve seat in said emergency piston means in circumscribing relation with said passage means, other passage means in said housing connecting said emergency chamber with said emergency and inlet ports, unidirectional valve means in said other passage means providing pressure fluid passage only from said emergency port to said emergency chamber and inlet port, second valve means in said emergency piston means normally urged to a closed position in sealing engagement with said second valve seat to interrupt pressure fluid communication between said emergency and connection chambers when said emergency piston means is in the inoperative position, a service port in said housing and connected with said connection chamber, a third valve seat in said connection chamber in circumscribing relation with said service port, third valve means in said connecting chamber for operative engagement with said third valve seat and normally establishing open pressure fluid communication between said service port and connection chamber when said emergency piston means is in the inoperative position, connecting means extending through said passage means between said second and third valve means, said emergency piston means being movable to an emergency position in said housing when the force of the fluid pressure in said emergency chamber acting on said second area exceeds that of the fluid pressure at said emergency port acting on said first area, said emergency piston means being initially movable toward the emergency position to move said third valve means to a closed position in sealing engagement with said third valve seat to interrupt pressure fluid communication between said service port and connection chamber and said emergency piston means being subsequently movable relative to said second and third valve means to disengage said second valve seat from said second valve means and establish pressure fluid communication between said emergency and connection chambers, said valve operating means being initially movable in response to established fluid pressure in said connection and control chambers to move said first valve seat into engagement with said first valve means, said exhaust opening being closed upon engagement of said first valve seat and first valve means, and said first valve means being thereafter moved by said valve control means to an open position establishing pressure fluid communication between said inlet and outlet ports.

References Cited by the Examiner

UNITED STATES PATENTS

| | | | |
|---|---|---|---|
| 2,441,050 | 5/48 | Wiegers | 303—29 |
| 2,832,646 | 4/58 | Fites. | |
| 2,883,997 | 4/59 | Schultz. | |
| 2,922,678 | 1/60 | Schultz | 303—29 |

EUGENE G. BOTZ, *Primary Examiner.*

JAMES S. SHANK, ARTHUR L. LA POINT,
*Examiners.*